(No Model.) 3 Sheets—Sheet 1.
C. L. MORSE.
VALVE RESEATING MACHINE.
No. 504,606. Patented Sept. 5, 1893.
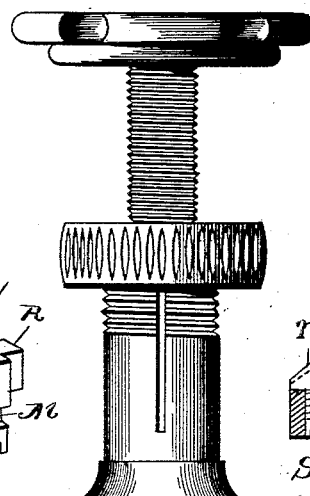
Fig. 1.
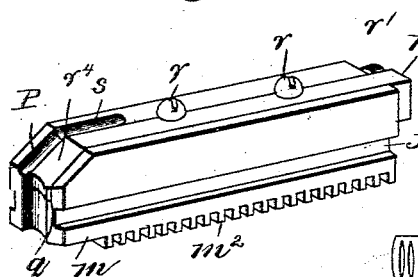
Fig. 6.
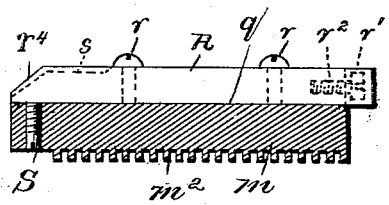
Fig. 7.
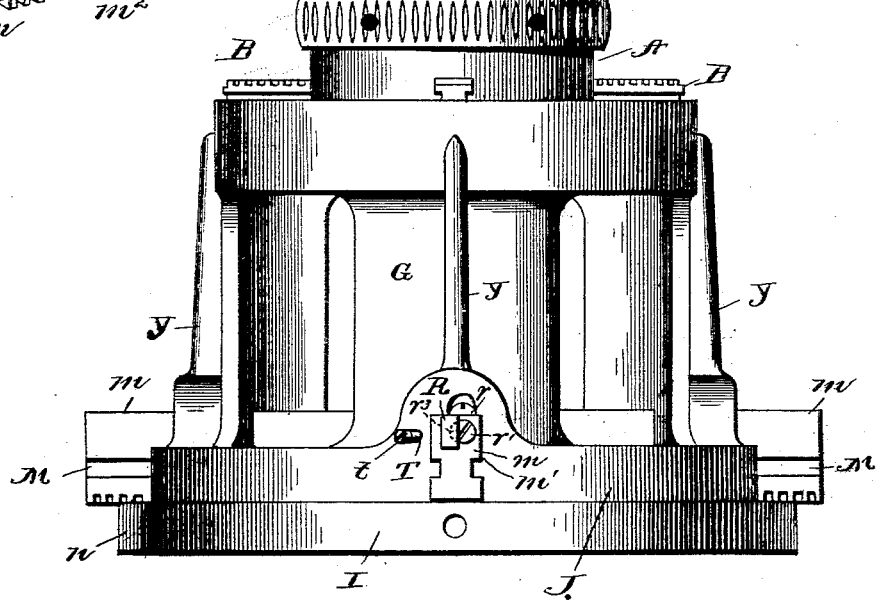
Witnesses
John C. Shaw
D. P. Nochaupter
By his Attorneys,
C. A. Snow & Co.
Inventor
Charles L. Morse

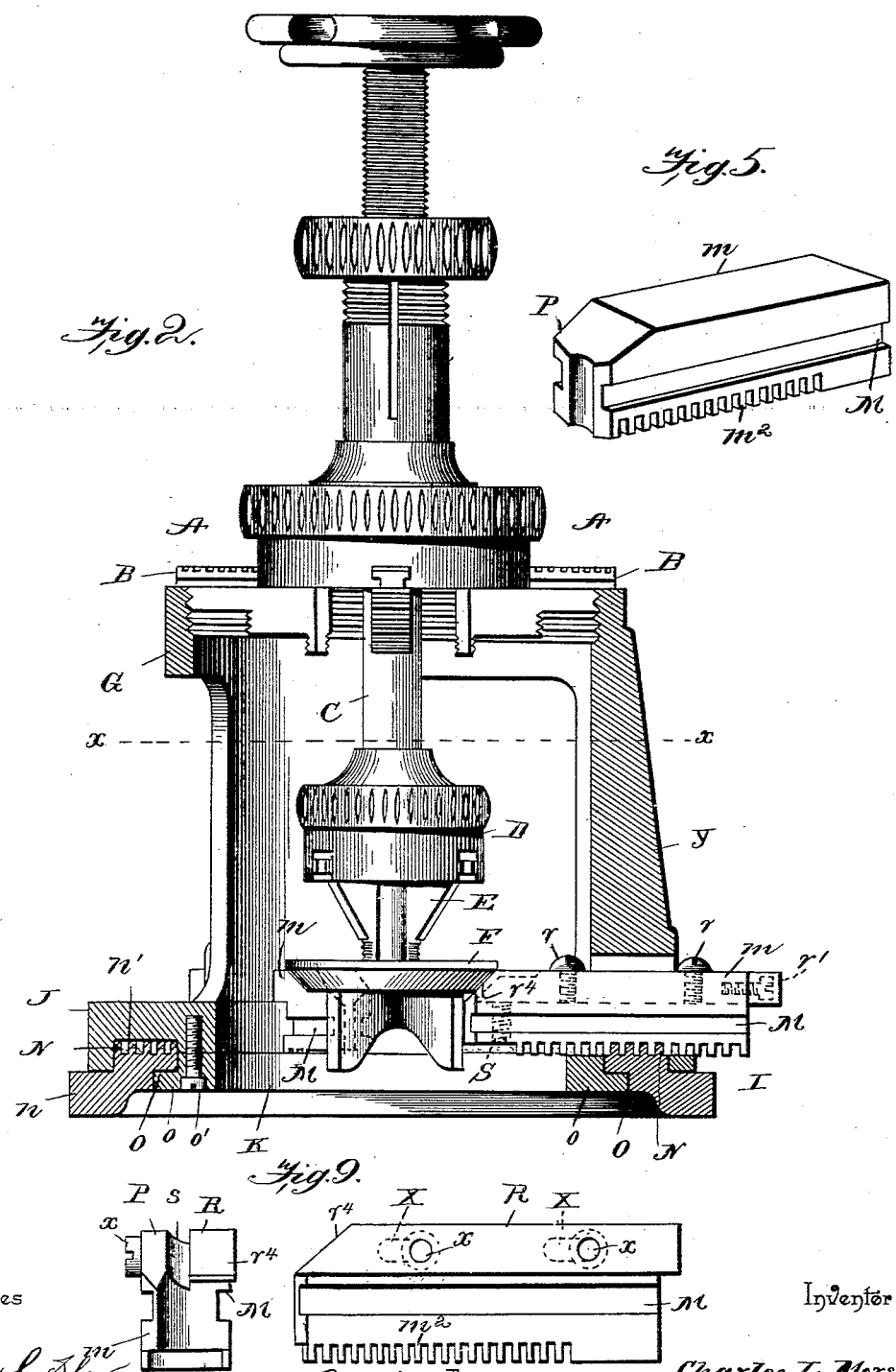

(No Model.)
C. L. MORSE.
VALVE RESEATING MACHINE.
No. 504,606.
3 Sheets—Sheet 3.
Patented Sept. 5, 1893.
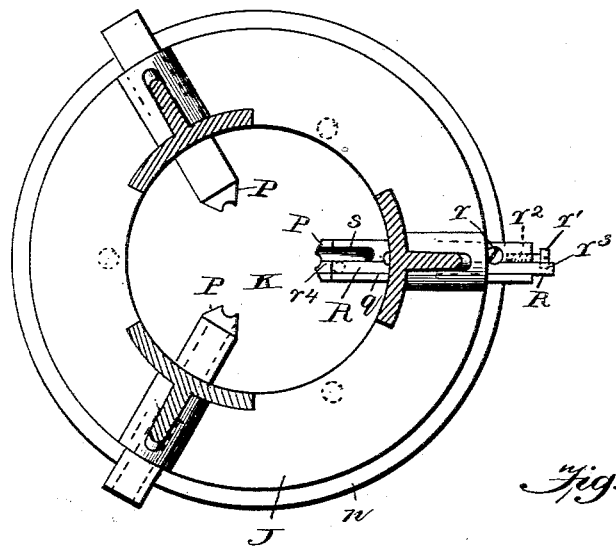
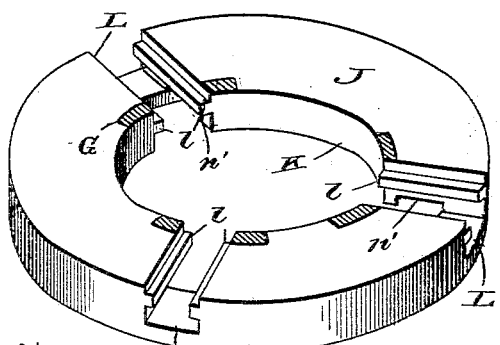
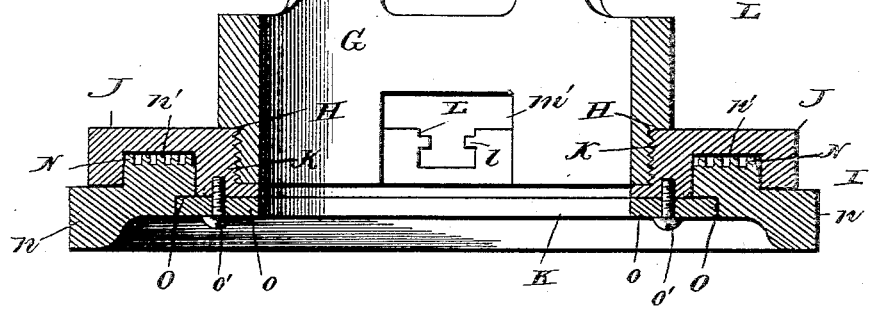
Witnesses
Inventor
Charles L. Morse.
By his Attorneys,

UNITED STATES PATENT OFFICE.

CHARLES L. MORSE, OF ATHOL, MASSACHUSETTS.

VALVE-RESEATING MACHINE.

SPECIFICATION forming part of Letters Patent No. 504,606, dated September 5, 1893.

Application filed February 4, 1893. Serial No. 460,961. (No model.)

*To all whom it may concern:*

Be it known that I, CHARLES L. MORSE, a citizen of the United States, residing at Athol, in the county of Worcester and State of Massachusetts, have invented a new and useful Valve-Reseating Machine, of which the following is a specification.

This invention relates to valve reseating machines; and it has for its object to provide certain improvements in the cutter attachments for such machines whereby the utility of the same will be greatly increased.

To this end the invention primarily contemplates certain improvements upon Letters Patent No. 456,704, granted to me July 28, 1891, and particularly upon the disk dressing attachment thereof, whereby the machine will be better adapted for repairing and refitting the disks of valves, faucets, &c., as well as for dressing all similar faces of any shape, which can be held in proper position by the chuck devices, to be operated upon by the cutter.

With these and other objects in view which will readily appear as the nature of the invention is better understood, the same consists in the novel construction, combination and arrangement of parts, hereinafter more fully described, illustrated and claimed.

In the accompanying drawings:—Figure 1 is a side view of the apparatus showing my improved cutter as adapted for dressing a valve disk. Fig. 2 is a vertical sectional view of the construction disclosed in Fig. 1 also showing a beveled or tapered valve disk being operated upon. Fig. 3 is a detail sectional view on the line $x$—$x$ of Fig. 2, the turning tool or chuck devices being removed. Fig. 4 is a detail in perspective of the cutter attachment separated from the chuck devices. Fig. 5 is a detail in perspective of one of the sliding jaws of the cutter attachment. Fig. 6 is a similar view of one of the sliding jaws having the cutting or dressing bit attached thereto. Fig. 7 is a detail sectional view of the cutter shown in Fig. 6. Fig. 8 is a detail sectional view of a modification of the cutter chuck. Fig. 9 is a detail elevation and end view of a modified attachment of the cutting or dressing bit to one of the sliding jaws.

Referring to the accompanying drawings, A represents the main fastening chuck having the radially adjustable chuck jaws B, and accommodating the revoluble and longitudinally adjustable spindle C, which is turned and adjusted in a manner similar to that described in my former patents either No. 429,939, or No. 456,704. The lower end of the spindle B, carries the auxiliary chuck D, between the movable jaws E, of which is designed to be clamped the stem of the valve F, being operated upon, as is clearly shown in my former patent, No. 456,704, and in Fig. 2 of the present application. It is of course understood that the auxiliary chuck may be omitted as the nature of the work may require and the spindle alone be employed as has been clearly described in my former patent.

The main fastening chuck A, is designed to detachably engage the interiorly threaded upper end of the skeleton cutter casing G, provided with the usual side openings in order to gain access to the auxiliary chuck therein, and, as illustrated in Fig. 8, said skeleton cutter casing may comprise separate skeleton sections $a$, screwed together in order to accommodate the chuck devices when it is necessary for the auxiliary chuck to be employed. The said skeleton cutter casing G, carries at its lower edge the cutter chuck I, which is provided with the upper circular guide plate J, preferably formed as the lower end portion of the casing, said plate having a central opening K, which is sufficiently large, so as to accommodate various sizes of valve disks which may be fed therein, to be operated upon by the cutters of the chuck. The said circular guide plate J, is also provided with a radial series of guide slots or ways L, having rabbeted edges $l$, taking into the opposite side guide grooves M, of the radially adjustable sliding jaws $m$, adapted to move in said guide slots or ways L, and also work through the casing slots or openings $m'$, formed in a line with the radial series of guide slots or ways $l$, in order to provide for the free adjustment of said sliding jaws. The several sliding jaws $m$, are provided upon their under faces, from end to end, with the parallel threads $m^2$. The parallel threads upon the under faces of the sliding jaws are engaged by the scroll threaded or worm flange N, of the movable chuck ring $n$. The scroll threaded or worm flange N, of said ring, works in a circular groove $n'$, formed in the bottom face of the guide plate concentric with the central opening, so that as the said chuck ring is turned in either direction, the worm thereof passing under the guide slots or ways L, engages the threads of the chuck jaws and simultaneously moves the same in or out according to the size of the valve disk being operated upon.

The revoluble chuck ring $n$, is provided with an inner shouldered portion O, which receives the flange of the flanged clamping plate $o$. Screws $o'$, pass through said clamping plate $o$, and into the guide plate J, near its central opening, so as to loosely clamp the revoluble chuck ring in position between the guide and clamping plates of the chuck, and thus allow the said chuck ring free movement in order to provide for the simultaneous adjustment of the radially adjustable chuck jaws.

The general construction of the cutter chuck being outlined, the specific construction of the sliding jaws thereof may be more particularly referred to. The said sliding jaws $m$, are oblong in shape, and as illustrated in the drawings, have their inner ends beveled as at P, so as to correspond to the bevel or taper of the valve disk being recut or dressed. One (or more) of the sliding jaws $m$, is further provided in its upper face with a longitudinally disposed groove $q$, extending from end to end thereof and designed to removably and adjustably receive the elongated cutting or dressing bit R. The said elongated cutting or dressing bit R, is held in position within the body of the sliding jaw by means of the retaining screws $r$, engaging threaded perforations in the top of the sliding jaw and having their heads working onto the top of the cutting or dressing bit, as clearly shown in the drawings, and said bit is adjusted longitudinally by means of the adjusting screw $r'$, working into a threaded opening $r^2$, in the outer end of the sliding jaw and having its head loosely fitting a notch $r^3$, in one side and at the outer end of the bit R, so that by adjusting said screw the bit may be adjusted longitudinally in its groove. A bit-setting screw S, is arranged to work through a threaded perforation in the bottom of the jaw carrying the cutter and near one end thereof so as to project into the cutter groove. By means of this setting screw, the bit can be slightly raised from its groove so as to allow for adjustment after grinding. As illustrated in the drawings, the cutting or dressing bit R, is also beveled at its inner end as at $r^4$, to correspond with the bevel of the valve disk being operated upon, and it is also beveled on one side to form a cutting edge next to the sliding jaw to which it is attached, so that as the turning tool rotates the valve disk, the same will be operated upon by the cutter.

The sliding jaw, carrying the cutter bit is provided at its inner end and top edge next to said bit with the chip groove $s$, into which the chips from the object being operated upon fall and work themselves out of the cutter. It is of course understood that one or more of these sliding jaws of the cutter attachment may be provided with the cutting or dressing bit, but I have illustrated but one jaw provided with the bit, and in such case the other sliding jaws, fitting the face of the valve disk, act in the capacity of guides to steady the work during operation. The adjustment of the cutting bit allows for wear in sharpening, and also allows other forms of bits to be placed in position.

By reason of the adjustability of the cutters of the cutter chuck, it will be readily seen that various sized disks may be operated upon, and it will of course be understood that according to the bevel of the valve disk, or as the face thereof may be either square or round, the inner ends of the sliding jaws are correspondingly shaped in order to provide for the proper dressing thereof. It may be well to observe at this point that the attachment casing may be provided at a point next to the slot through which the jaw carrying the bit moves, with an angularly disposed threaded opening T, which receives a binder screw $t$, which may be screwed onto the jaw carrying the bit in order to hold the cutter steady during the operation.

As clearly illustrated in the drawings, a slight modification of the construction herein described might be observed, and as shown in Fig. 8, before referred to, in such modification, the skeleton cutter casing G, may be provided at its lower edge with the exteriorly threaded shoulder H, which is adapted to screw into the central opening K, of the chuck guide plate J, which is threaded as at $k$, to receive it, and in connection with this modification and in Fig. 9, of the drawings, I show a modified attachment for the cutting or dressing bit R. In both forms the cutting or dressing bits R, are reversible on the jaw to which they are attached so as to present a beveled or straight cutting edge. In the modification shown in Fig. 9, the sliding jaw to which the bit is attached is provided with the slots X, through which pass the combined adjustment and cutting screws $x$, which are adapted to engage the threaded perforations in the body of the cutting or dressing bit. It may be observed at this point that the casing in both forms is provided with an exterior integral rib Y, by means of which it may be securely mounted in the device for operation.

Changes in the form, proportion, and the minor details of construction as embraced within the scope of the appended claims, may be resorted to without departing from the principle or sacrificing any of the advantages of this invention.

Having thus described my invention, what I claim, and desire to secure by Letters Patent, is—

1. In a cutter attachment for valve reseating machines the combination with the chuck devices; of an attachment casing adapted to be removably connected at one end to said chuck devices and carrying at its other end a stationary circular guide plate provided with a central opening, a radial series of guide slots or ways having rabbeted edges, and a circular bottom groove intersecting said slots or ways, said attachment casing being further provided with a series of slots or openings above its stationary guide plate, a series of sliding cutter jaws moving in said slots or ways and having side grooves engaging the rabbeted edges thereof, and bottom threads, said jaws also working through the slots in said casing, and a movable chuck ring clamped to the outside of said stationary guide plate and having a raised scroll or worm flange moving in the circular bottom groove of said guide plate and engaging the threads of said cutter jaws, substantially as set forth.

2. In a cutter attachment for valve reseating machines, the combination with the chuck devices carrying a work holder or auxiliary chuck; of a skeleton casing screw threaded at one end to removably receive said chuck devices and inclose the work holder or auxiliary chuck, said casing carrying at its other end a stationary circular guide plate, a series of sliding radially adjustable cutter jaws mounted in said guide plate, and an adjusting ring loosely clamped to said stationary guide plate and engaging said cutter jaws, substantially as set forth.

3. In a valve reseating machine, the combination of an attachment casing adapted to receive the turning-tool, and having a series of slots or openings, and an angularly disposed threaded opening leading into one of said slots, a cutter chuck provided with a central opening receiving the object being operated upon, and a series of sliding radially adjustable cutter jaws adapted to work through the slots in said casing, and a binder screw adapted to work in said threaded opening and onto one of said jaws, substantially as set forth.

4. The combination with a valve reseating machine, having a cutter chuck provided with sliding jaws; of a separate and independent cutting bit clamped for longitudinal adjustment to one or more of said jaws and provided with an inner cutting end conforming to the face of the object being dressed, substantially as set forth.

5. In a cutter attachment for valve reseating machines the cutter chuck having a series of radially adjustable sliding jaws having inner ends conforming to and touching the face of the object being dressed, one or more of said jaws being further provided at one end and top edge with chip grooves, and cutting or dressing bits adjustably clamped to said jaws next to said chip grooves on said jaws, substantially as set forth.

6. In a cutter attachment for valve reseating machines, the cutter chuck having a series of radially adjustable sliding jaws, said jaws being provided with inner beveled ends, one or more of said jaws being further provided with longitudinally disposed grooves in their upper faces and extending from end to end, and chip grooves at one end and top edge, elongated adjustable and reversible cutting or dressing bits seated in said top grooves, retaining screws threaded into the jaw or jaws carrying the cutters and having their heads working onto the bits, adjusting screws threaded into one end of the cutter jaw or jaws and engaging the cutting bits, and a bit setting screw working into the upper face grooves, substantially as set forth.

In testimony that I claim the foregoing as my own I have hereto affixed my signature in the presence of two witnesses.

CHAS. L. MORSE.

Witnesses:
  CHARLES R. JACKSON,
  ANDREW J. HAMILTON.